Oct. 22, 1968 R. M. KOFF 3,406,971
THREE-DIMENSIONAL LABYRINTH
Filed April 7, 1965
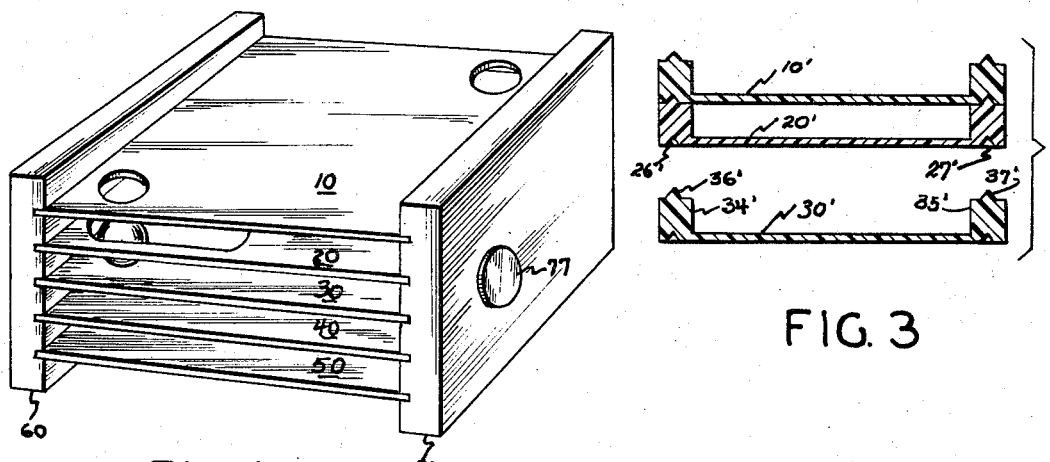
FIG. 1
FIG. 3
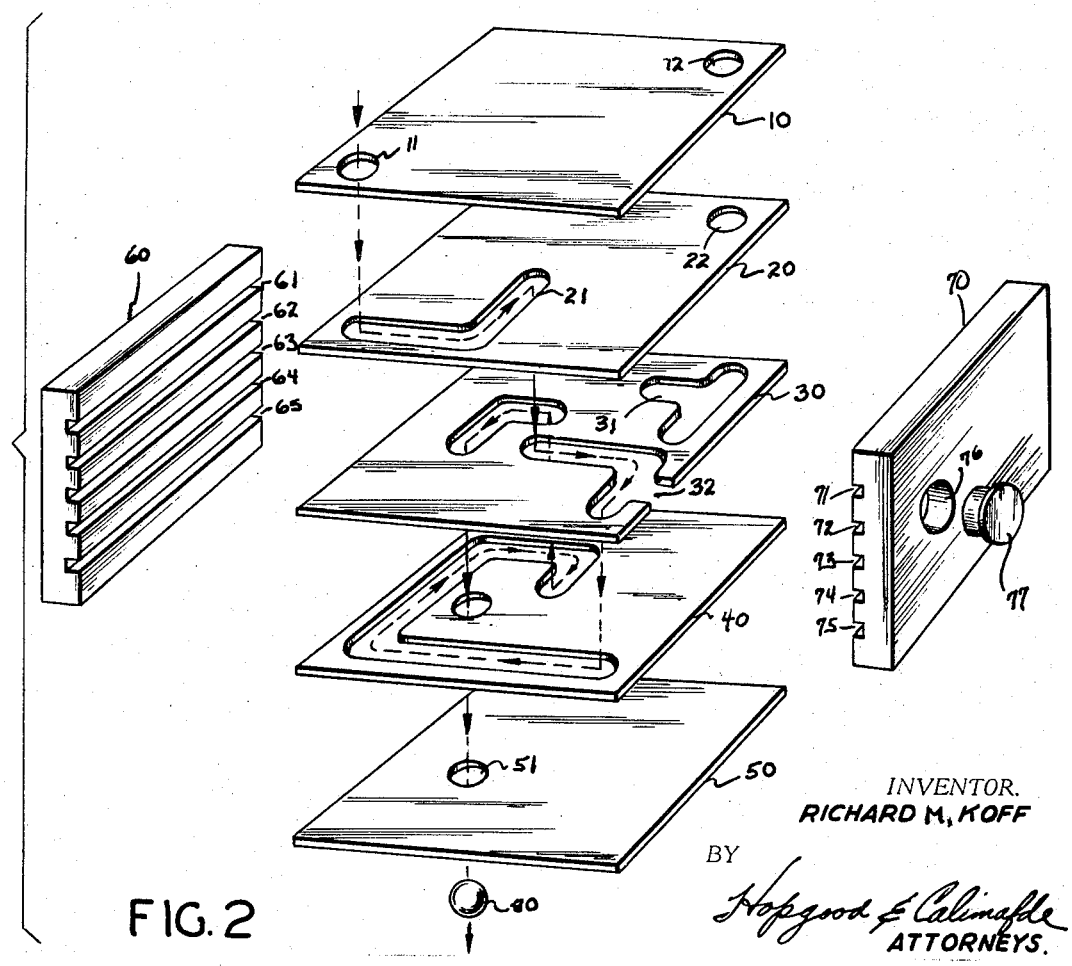
FIG. 2
INVENTOR.
RICHARD M. KOFF
BY Hopgood & Calimafde
ATTORNEYS.

United States Patent Office 3,406,971
Patented Oct. 22, 1968

3,406,971
THREE-DIMENSIONAL LABYRINTH
Richard M. Koff, 400 Central Park W.,
New York, N.Y. 10025
Filed Apr. 7, 1965, Ser. No. 446,156
8 Claims. (Cl. 273—109)

ABSTRACT OF THE DISCLOSURE

A three-dimensional labyrinth employing a moving ball dimensioned to ride within configured slots in stacked transparent sheets, maintained in a fixed array.

---

This invention relates to labyrinths, and in particular, to a novel three-dimensional labyrinth, the complexity of which may be easily varied, depending upon the age group to which it is directed.

Conventional two and three dimensional labyrinths suffer many inherent disadvantages. Two dimensional labyrinths, for example, while they can be increased in complexity, tend to become extremely bulky, due to the restriction of single plane. Three-dimensional labyrinths, on the other hand, may easily be made more complex, however, as the complexity increases, the visibility required to run the maze decreases. Moreover, the compartmentalized units upon which most three-dimensional labyrinths are predicated tend to add to the bulk and make the maze difficult and expensive to manufacture.

Accordingly, it is the object of this invention to provide a labyrinth of flexible complexity, whose bulk may be maintained within reasonable limits when high order mazes are desired.

It is another object of this invention to provide a maze which may be cheaply and easily manufactured and all of whose portions are accessible from the periphery.

It is a further object of this invention to provide a labyrinth whose visibility is less significantly affected by complexity than conventional labyrinths.

Briefly, the invention is predicated upon the concept of a plurality of planar elements, each having one or more slots therein which, when stacked, form an organized pattern through which a movable member, such as a ball, may move; the ball being guided by the sides of the slot while being maintained at its vertical reference level, when desired, by the underlying planar element.

The above mentioned and other features and objects of this invention and the manner of attaining them will become more apparent and the invention itself will best be understood by reference to the following description of embodiments of the invention taken in conjunction with the accompanying drawings wherein:

FIG. 1 is a perspective view of one embodiment of a three-dimensional labyrinth according to the invention; and FIG. 2 is an exploded perspective of the embodiment of FIG. 1 showing elemental details; and FIG. 3 illustrates an alternate arrangement for maintaining the planar elements in a stacked array.

The invention will now be described with reference to FIGS. 1 and 2.

In FIG. 2, there may be seen five planar elements 10, 20, 30, 40 and 50 arranged in a vertical stack. Each element contains one or more slots in a preferably transparent sheet; the slots taking the forms of holes, diagonals, dog legs, etc., depending upon the complexity desired. The elements are maintained in their respective positions by the end pieces 60 and 70, each having five parallel grooves (61–65, 71–75) for engaging the ends of the elements.

The design of the labyrinth itself and therefore the nature of the slot in each elemental portion may be easily realized by following an X—Y—Z coordinate system with each planar element, divided into units in the X—Y plane.

For clarity, an exploded view (to be discussed) has been chosen to illustrate one pattern of slots which may be employed. In this figure the path of the ball 20 from start to finish may be seen by following the dotted lines.

Upon dropping the ball 80 through one of the starting holes (for example, the forward one 11), it will pass through planar element 10 and stop mid-way through the L-shaped slot 21 in planar 20. Tilting the maze to the right back corner will cause the ball to follow the latter slot, riding on planar element 30 until such time as the end of this slot is reached, whereupon the ball will drop fully through planar element 20 and midway through element 30 and so on, the maze being tilted, up-ended and reversed until the finish hole 51 is reached. The maze complexity may be easily increased by false routes, such as the path created by holes 12 and 22 in elements 10 and 20 respectively, and the T-shaped slot 31 in element 30; by creating path reversals (see, for example, the double entries into elements 30 and 40) which require the operator to flip the maze several times before the finish hole may be reached; and by providing peripheral exits from the maze, such as that shown in planar element 30 at 32. To allow the operator to choose his own degree of complexity, the end piece 70 includes, adjacent the peripheral slot 32, an aperture 76 fitted with a removable plug 77. The insertion of this plug blocks the exit and reduces the dexterity necessary to run the maze.

Needless to say, the peripheral exit may also be utilized as an entrance to the maze, the object being to get the ball to exit from one of the start and finish holes.

As has been mentioned, side pieces 60 and 70 maintain the planar elements in the desired array. While, for rigidity, glue may be employed at the junctures, the overall manner in which planar elements are held in position is optional and considerations such as cost, esthetics or ease of manufacture, may control the particular embodiment desired. For example, side pieces of mahogany or brass would lend esthetic value. Alternatively, the planar elements may be held together by bolts passing through peripheral portions of the planar elements (or even a single centrally located bolt), there being spacers between adjacent elements. In the case of a centrally located bolt, the relative rotability of the elements would afford further complexity in threading the maze. Moreover, there need be no additional elements whatever and each planar element may be provided with flanges; the array being held together by glue.

FIG. 3 illustrates an embodiment in which the latter arrangement is deviated from slightly to provide a quite flexible structure which allows the operator to construct his own three-dimensional labyrinth, a step which itself requires a good deal of logical manipulation. In this embodiment each of the peripheral flanges (e.g., 34' and 35'), provided each of the planar elements 10', 20' and 30', include at the top thereof one or more pins (e.g., 36' and 37'). These pins enter mating cavities (e.g., 26' and 27') at the underside of the overlying planar element to secure the labyrinth.

From FIG. 1 it may be seen that the dimensional restrictions on the maze are: that the ball or moving member be greater in size than the distance between adjacent planar elements (so that the ball may not ride out of the slot); and that the ball or moving member be just smaller than the distance between alternate planar elements (so the ball may move freely). Within these restrictions, a large variety of dimensions are permissible. For example, the layers may be made as thin as practically possible or, on the other hand, as thick as to be touching. In the latter case, the dimension of the ball might vary from as small as a BB (since it could not slip out between adjacent layers) to just less than the thickness of one layer. Thus, while the layers may be said to be spaced, it is to be understood that this "spacing" may reach zero.

From the foregoing, it may be seen that according to the inventive concept, labyrinths may be simply and easily manufactured, there being no vertical members (aside from the end pieces, where desired) to complicate the stacking. Further, because the ball rides partially within a layer, as opposed to conventional labyrinths, where it must ride between adjacent layers, the vertical dimension is greatly reduced. The absence of internal vertical members increases visibility without disadvantages. Moreover, because the method of holding the labyrinth together is extremely flexible, considerations such as esthetics, cost and ease of manufacture may dominate independently.

While I have described above the principles of my invention in connection with specific apparatus, it is to be clearly understood that this description is made only by way of example and not as a limitation to the scope of my invention as set forth in the objects thereof and in the accompanying claims. For example, the moving member might be metallic and magnetic traps may be strategically located along the main route. Needless to say, the ball might be a magnet and the traps metallic. In either case the plug shown in FIG. 1 may be made of one of these materials and the ball of the other; the insertion of an interchangeable nonmetallic, nonmagnetic plug destroying the trap. Further, the planar elements may be transparent or opaque and may be colored at the different levels. The moving part need not be a sphere, nor must the labyrinth be air filled. A liquid filled labyrinth with the moving member slightly heavier would slow down motion and allow more time in complex mazes. Finally, the maze might be large enough for a child to climp through or roll a beach ball through or it could be small enough to operate with a BB.

I claim:

1. A three-dimensional labyrinth comprising: a ball; a plurality of planar elements, each having at least one slot therein having a minimum transverse dimension greater than the diameter of said ball; and means for maintaining said elements in parallel relationship, the ball diameter being greater than the distance separating adjacent planar elements and less than the distance between alternate planar elements, there being communication between selected adjacent element slots to effect a series of passageways for the ball from at least one predetermined location in one of said slots to another in another of said slots.

2. A three-dimensional labyrinth comprising: a ball; a plurality of planar elements, each having at least one slot therein having a minimum transverse dimension greater than the diameter of said ball; and means for maintaining said elements in stacked, equispaced, parallel relationship, the ball diameter being greater than the distance separating adjacent planar elements and less than the distance between alternate planar elements, there being communication between selected adjacent element slots to effect a series of passageways for the ball from at least one predetermined location in one of said slots to another in another of said slots.

3. The labyrinth claimed in claim 2 in which said planar elements are transparent.

4. The labyrinth claimed in claim 2 in which at least one of said planar elements has a slot communicating with an end thereof for diverting said ball from said series of passageways.

5. The labyrinths claimed in claim 2 in which said maintaining means comprises a pair of grooved end pieces disposed on opposite sides and perpendicular to said stacked elements, opposite end portions of each of said elements engaging respective grooves in said end pieces.

6. The labyrinth claimed in claim 4, in which said maintaining means comprises a pair of grooved end pieces disposed on opposite sides and perpendicular to said stacked elements, opposite end portions of each of said elements engaging respective grooves in said end pieces, and in which at least one of said side pieces has an aperture therein, disposed adjacent said peripheral slot, and a plug for sealing said aperture.

7. The labyrinth claimed in claim 2 in which said maintaining means comprises at least one pair of flanges at the respective ends of each planar element; and interengaging means between each flange and the mating portion of the next planar element.

8. A three-dimensional labyrinth comprising:
a movable member;
a plurality of planar elements;
a number of said plurality each having at least one elongated slot therein running longitudinally in the plane of said element;
means for maintaining the elements in parallel relationship spaced for longitudinally guiding the movable member on two sides by said slot and on two orthogonal sides by said planar elements, there being communication between selected adjacent element slots in a direction perpendicular to the plane of said elements to effect a series of passageways for the movable member from at least one predetermined location in the labyrinth to another;
and one dimension of said movable member being less than the traverse dimension of said slots and a second dimension of said movable member taken in a direction orthogonal to said one dimension being respectively less than and greater than the spacing between alternate and adjacent planar elements.

References Cited

UNITED STATES PATENTS

| 2,571,521 | 10/1951 | Barnhart | 46—43 |
| 2,729,020 | 1/1956 | Frampton | 46—43 |
| 3,075,770 | 1/1963 | Young | 273—109 |

FOREIGN PATENTS

| 653,661 | 11/1962 | Canada. |
| 1,146,275 | 11/1957 | France. |
| 752,110 | 7/1956 | Great Britain. |
| 23,621 | 2/1904 | Great Britain. |

RICHARD C. PINKHAM, *Primary Examiner.*

T. ZACK, *Assistant Examiner.*